United States Patent [19]

Klima

[11] Patent Number: 4,938,012
[45] Date of Patent: Jul. 3, 1990

[54] CUTTING BLADE FOR CUTTING A PLURALITY OF FLEXIBLE MEMBERS

[76] Inventor: Walter F. Klima, 59 Chestnut Hill La. S., Williamsville, N.Y.

[21] Appl. No.: 342,590

[22] Filed: Apr. 24, 1989

Related U.S. Application Data

[63] Continuation of Ser. No. 109,175, Oct. 16, 1987, abandoned.

[51] Int. Cl.$^5$ .............................................. A01D 34/63
[52] U.S. Cl. ............................................................ 56/295
[58] Field of Search ................................................ 56/295

[56] References Cited

U.S. PATENT DOCUMENTS

| | | | |
|---|---|---|---|
| 2,786,322 | 3/1957 | McEvers | 56/295 |
| 2,859,581 | 11/1958 | Kroll et al. | 56/295 |
| 2,869,311 | 1/1959 | Berston, Jr. | 56/295 |
| 2,908,128 | 10/1959 | Mauro | 56/295 |
| 2,920,436 | 1/1960 | Benson | 56/295 |
| 2,936,564 | 5/1960 | Berry | 56/293 |
| 3,015,929 | 1/1962 | Bright | 56/295 |
| 3,078,573 | 2/1963 | Kern | 56/295 |
| 3,080,697 | 3/1963 | Mauro | 56/295 |
| 3,097,468 | 7/1963 | Johnson | 56/295 |
| 3,097,469 | 7/1963 | Belfiore | 56/295 |
| 3,191,371 | 6/1965 | Brewer | 56/295 |
| 3,327,460 | 6/1967 | Blackstone | 56/295 |
| 3,343,354 | 9/1967 | Freedlander et al. | 56/295 |
| 3,346,350 | 9/1967 | Freedlander et al. | 56/295 |
| 3,369,354 | 2/1968 | Freedlander et al. | 56/295 |
| 3,382,654 | 5/1968 | Freedlander et al. | 56/295 |
| 3,445,992 | 5/1969 | Hanson et al. | 56/295 |
| 3,447,291 | 6/1969 | Guetterman | 56/295 |
| 3,449,894 | 6/1969 | Freedlander et al. | 56/295 |
| 3,538,692 | 11/1970 | Cope et al. | 56/295 |
| 3,596,453 | 8/1971 | Smith | 56/295 |
| 3,636,685 | 1/1972 | Speckman | 56/295 |
| 3,665,692 | 5/1972 | Hughes | 56/295 |
| 3,686,841 | 8/1972 | Mager et al. | 56/295 |
| 3,762,138 | 10/1973 | Michael | 56/295 |
| 3,780,509 | 12/1973 | Woelffer | 56/295 |
| 3,975,891 | 8/1976 | Gunther | 56/295 |
| 4,043,104 | 8/1977 | Jones | 56/295 |
| 4,250,622 | 2/1981 | Houle | 56/295 |
| 4,651,510 | 3/1987 | Malutich | 56/295 |

Primary Examiner—Paul J. Hirsch
Attorney, Agent, or Firm—William L. Klima

[57] ABSTRACT

A blade for cutting a plurality of flexible member extending from a substrate, such a grass and/or brush extending from the ground or foilage extending from a branch. The blade having a cutting edge positioned remote from a portion of a leading edge, located at an exposed side of the blade substantially facing the substrate, ground, or branch, during a path of movement of the blade during a cutting operation in one embodiment. In another embodiment, the blade is a rotary lawn and brush mower blade made of plastic.

20 Claims, 2 Drawing Sheets

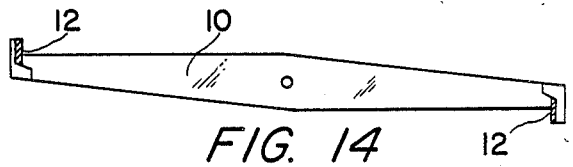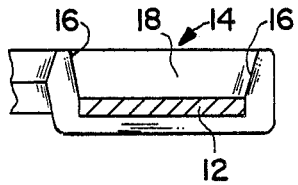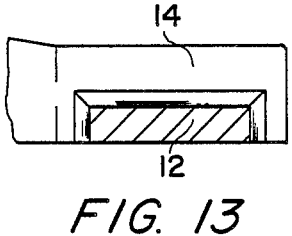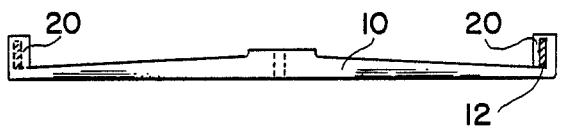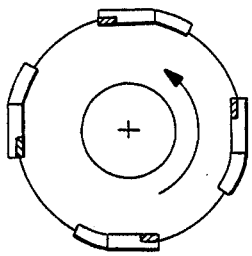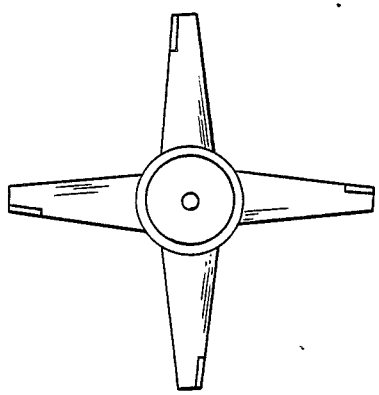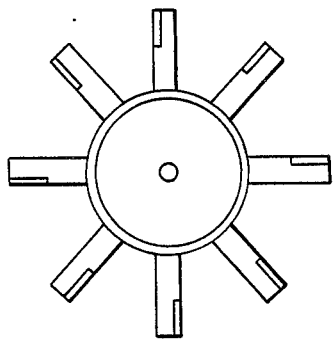

4,938,012

CUTTING BLADE FOR CUTTING A PLURALITY OF FLEXIBLE MEMBERS

This application is a continuation of application Ser. No. 109,175 filed on Oct. 16, 1987, now abandoned.

BACKGROUND OF THE INVENTION

The present invention is directed to a cutting blade that can be utilized for leveling a surface composed of a plurality of flexible members oriented substantially perpendicular to the surface such as an area of lawn composed of a plurality of grass blades. The present invention can be utilized with reel-type lawn mowers and is particularly well suited for use as an original equipment blade or as a replacement for a conventional rotary lawnmower blade.

Conventional lawn mower blades comprise a metal bar having a hole at its center for mounting to a powered shaft and a section along the leading edge of each tip sharpened to a sharp knife-like low angle cutting edge typically by a grinding operation. Conventional blades are susceptible to wear and damage particularly in a commercial setting where conventional blades may need resharpening as much as twice per day. The cutting edges of the conventional blade can be resharpened, but requires the nuisance and downtime of operation for removing the blade with tools and requires readily available access to a somewhat expensive grinder for sharpening the blade. Also, a conventional blade can only be resharpened a limited number of times before it must be discarded due to its reduced dimensions from repeated sharpening resulting in decreasing structural strength of the bar at its tips eventually leading to a dangerous condition if further used. The blade of the present invention appears to demonstrate superior durability and maintenance of a sharp cutting edge as compared with conventional blades. Also, the blade of the present invention provides a substantial increase in operational safety over conventional blades, since the leading edges of the tips of the blade according to some embodiments of the present invention are substantially blunt as compared to knife-like leading edges at the tips of conventional blades. This feature would substantially reduce the extent of injury to a person who accidentally comes into contact with the blade during operation.

The blade of the present invention can also be utilized with trimming machines for cutting weeds, underbrush, and other foliage.

SUMMARY OF THE INVENTION

An object of the present invention is to produce an improved cutting blade.

Another object of the present invention is to produce an improved cutting blade demonstrating improved durability damage-resistance, improved quality of cut, increased safety, and retention of sharp cutting edge characteristics.

A further object of the present invention is to provide an improved cutting blade comprising a bar with a hardened insert acting as a cutting edge.

Another further object of the present invention is to provide and improved cutting blade comprising a bar provided with a cutting edge remote from the lower leading edge of the bar.

A still further object of the present invention is to provide an improved cutting blade comprising a metal bar provided with a hardened metal insert having a cutting edge wherein the cutting edge of the hardened metal insert is located at a position remote from the lower leading edge of the bar.

An additional object of the present invention is to provide an improved cutting blade comprising a plastic bar or disk provide with a plurality of arms with the tips of the plastic bar or arms, respectively, provided with metal inserts each having a cutting edge.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a cross-sectional view of the blade as indicated in FIG. 7.

FIG. 12 is a detailed frontal view of the tip of the blade shown in FIG. 6.

FIG. 13 is a detailed top view of the tip of the blade shown in FIG. 7.

FIG. 14 is a top view of still another embodiment of the blade of the present invention.

FIG. 15 is a side view of the blade shown in FIG. 14.

FIG. 16 is a cross-sectional view of a further embodiment of the present invention.

FIG. 17 is a cross-sectional view of a reel-type blade embodiment of the present invention.

FIGS. 18 and 19 are additional embodiments of the present invention.

DETAILED DESCRIPTION OF PREFERRED EMBODIMENTS

Figure 1:
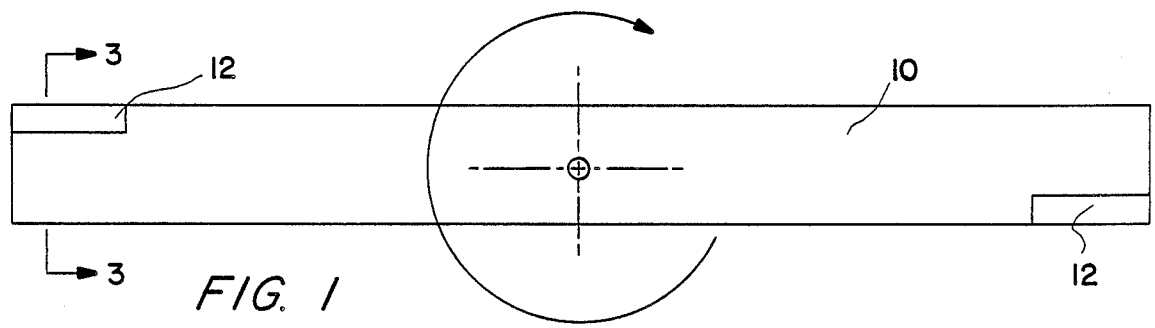
FIG. 1 shows an embodiment of the cutting blade of the present invention.
Figure 3:
FIG. 3 shows a cross section of the blade shown in FIG. 1.
Figure 2:
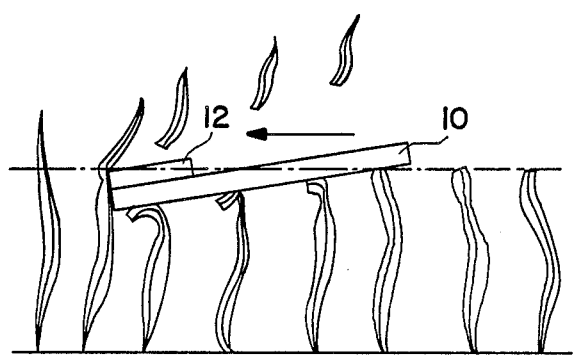
FIG. 2 shows the cutting blade of the present invention in operation.
Figure 5:
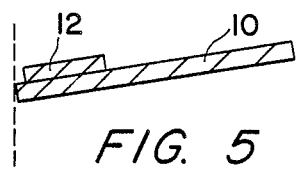
FIG. 5 shows a cross section of another embodiment of the present invention with the insert set back or displaced a distance away from the leading edge.

An embodiment of the blade of the present invention comprises essentially a conventional blade bar 10 provided with inserts 12 of a hard material such as steel, hardened steel, Tungsten Carbide, ceramic, plastic, etc.

provided at or near the leading edge of each tip of blade bar 10 as shown in FIG. 1. The inserts can be attached on a lower surface and set back from the leading face of each tip (similar to FIG. 10), provided in cut-out portions of each tip or can be located on an upper surface of each tip as shown in FIGS. 2, 3, and 5. Providing the inserts on the top surface of each tip is particularly advantageous since the inserts, which are made of materials that may exhibit brittle characteristics, are protected from damage due to impact of the blade with hard objects such as rocks, cement edging, etc. As illustrated in FIG. 2, the upper leading edge of the insert is the cutting edge. Even with the leading face of the bar/insert combination being substantially flat or blunt, the cutting edge provides an excellent cutting edge due to high shear forces exerted on each grass blade resulting from the large change of momentum of mass of the grass blade located below the cutting edge versus the virtually stationary mass of the grass blade located above the cutting edge of the insert causing the grass blade to sharply bend at the cutting edge upon impact of the leading face of the bar/insert combination.

Figure 4:
FIG. 4 shows an insert utilized with the blade shown in FIG. 1.

FIG. 3 illustrates insert 12 being attached to blade bar 10 by a layer of bronze, solder, adhesive, or melt resulting from welding (arc, ultrasonic, etc.), etc. depending upon the material utilized for the blade bar 10 and inset 12. FIG. 4 shows a rectangular parallelpiped configuration for a preferred embodiment of insert 12. Tungsten Carbide can be obtained easily and economically in this configuration reducing the cost of manufacturing the blade of the present invention.

FIG. 5 illustrates a preferred embodiment in which the insert 12 is both located on the top surface of the tip of the blade and removed or set back a distance from the leading edge of the blade bar 10 at the tip.

Figure 6:
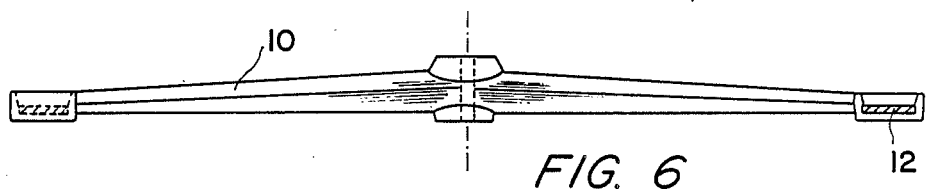
FIG. 6 shows a further embodiment of the present invention.
Figure 7:
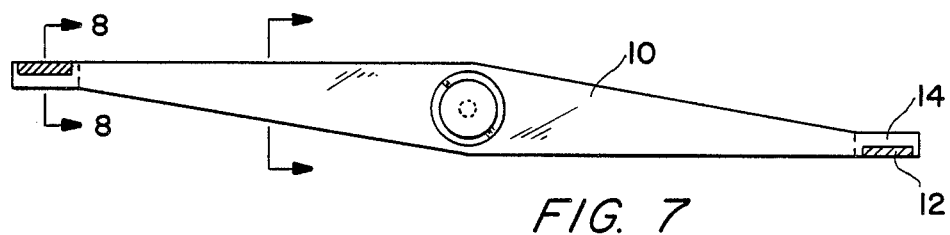
FIG. 7 shows a top view of one of the tips of the blade shown in FIG. 6.

In FIG. 6, an advanced blade of a preferred embodiment of the present invention is illustrated. The blade shown in FIG. 6 can be made of metal, but preferably of a plastic such as Nylon or ABS (acrylonititrile/-butadiene/styrene) or other advanced composite materials such as graphite, Kevlar, or combinations of composite materials impregnated with resins such as epoxy, polyester, etc.

Figure 8:
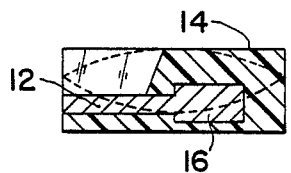
FIG. 8 is a cross-sectional view of the tip of the blade as indicated in FIG. 7.
Figure 9:
FIG. 9 is a cross-sectional view of the tip of a further embodiment of the blade of the present invention.
Figure 10:
FIG. 10 is a cross-sectional view of the tip of still a further embodiment of the blade of the present invention.

FIGS. 8–10 show various embodiments of providing an insert 12 in a tip 14 of the blade shown in FIG. 6. The insert 12 is either made or machined with a protrusion or section 16 of increased thickness for securely anchoring the insert in the tip. If the blade bar 10 is made of plastic or composite material, the blade bar is mold over each insert 16 forming an integral structure.

The dotted line shown in FIG. 8 and solid line in FIG. 11 illustrate that the cross-sectional shape of the blade bar 10 is preferably the shape of an airfoil for creating a lower pressure above the blade and a higher relative pressure below the blade for raising cut blades of grass above the blade to be directed out a conventional chute preferably connected to a grass catcher. FIGS. 12 and 13 show details of the shape of each tip of the blade shown in FIG. 6. Lateral edges 16 are slightly inclined for added tip strength and inclined surface 18 aids in deflecting cut blades of grass upwardly.

FIGS. 14 and 15 illustrated a preferred embodiment of the blade of the present invention for use for example with a weed trimming apparatus. Each tip 20 is oriented substantially perpendicular to the blade bar 10. Inserts 12 are preferably located inwardly of the outer most edge portion of each tip for protection of the inserts.

FIG. 16 shows an embodiment wherein the bar has a substantially rectangular and substantially uniform cross section at its tip with the upper unexposed leading edge being the cutting edge. Preferably the cutting edge is hardened by any well known conventional process.

FIG. 17 shows a cross section of a reel-type mower blade utilizing four individual blades of the present invention.

FIG. 18 shows one embodiment utilizing four arms including remote cutting edges located at the tips of each arm and FIG. 19 shows another embodiment utilizing a plurality of arms extending from a disc structure including remote cutting edges located at the tips of each arm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A lawn and brush mower blade assembly to cut grass and brush extending from a substrate such as the ground, said blade comprising:
    a support bar having an exposed side facing the substrate during operation of the blade assembly, and an unexposed side positioned opposite to said exposed side;
    a cutting bar attachment secured on at least a portion of said unexposed side of said support bar, said cutting bar attachment having a substantially flat leading surface for cutting the grass and brush oriented substantially perpendicular to a path of movement of said support bar during operation of said blade assembly, said substantially flat leading edge being positioned substantially flush with a leading edge of said support bar; and
    means for attaching said support bar to a drive for propelling the blade assembly against the grass and brush during a cutting operation.

2. A blade assembly according to claim 1, wherein said support bar includes a blunt leading surface positioned substantially flush with said substantially flat leading surface of said cutting bar attachment.

3. A blade assembly according to claim 1, wherein both said exposed and unexposed sides of said support bar have substantially flat portions positioned parallel relative to each other.

4. A blade assembly according to claim 3, wherein said cutting bar attachment is defined by a bar of material having a rectangular cross section attached to said flat portion of said unexposed side of said support bar.

5. A blade assembly according to claim 2, wherein both said exposed and unexposed sides of said support bar have substantially flat portions positioned parallel relative to each other.

6. A blade assembly according to claim 5, wherein said cutting bar attachment is defined by a bar of material having a rectangular cross section attached to said flat portion of said unexposed side of said support bar.

7. A blade assembly according to claim 1, wherein said cutting bar attachment is defined by an insert having a rectangular cross section connected to said support bar.

8. A blade assembly according to claim 7, wherein said insert is provided with at least one protrusion for anchoring it to said support bar.

9. A blade assembly according to claim 7, wherein said insert is adhered to said support bar.

10. A blade assembly according to claim 1, wherein said cutting bar attachment is made of a material selected from the group consisting of metal, hardened metal, ceramic, tungsten carbide, plastic and combinations thereof.

11. A blade assembly according to claim 1, wherein said cutting bar attachment is made of tungsten carbide, and attached to said support bar by a process selected from the group consisting of soldering, brazing, gluing, attaching by fastener, welding and combinations thereof.

12. A blade assembly according to claim 1, wherein said cutting bar attachment includes a cutting edge having an approximately 90 degree cross section.

13. A blade assembly according to claim 1, wherein said cutting bar attachment is attached to said unexposed side of said support bar, and set back a predetermined distance from said leading edge of said support bar.

14. A blade assembly according to claim 1, wherein said support bar is made of plastic.

15. A blade assembly according to claim 14, wherein said plastic is selected from the group consisting of nylon, carbon/graphite composite, Kevlar/resin, ABS and high impact plastic.

16. A blade assembly according to claim 1, wherein said support bar extends from a disk having at least one other similar support bar extending therefrom.

17. A blade assembly according to claim 1, wherein said support bar is defined by an elongated member having an air foil cross section along at least a portion of its length.

18. A blade assembly according to claim 7, wherein said support bar is provided with a recess in which said insert is disposed.

19. A blade assembly according to claim 18, wherein a back wall of said recess is inclined to deflect cut grass and brush away from the blade assembly.

20. A blade assembly according to claim 1, wherein said support bar includes a tip portion set at an angle of approximately 90 degrees with respect to a center portion of said support bar.

* * * * *